(12) United States Patent
Maeda

(10) Patent No.: US 12,722,593 B2
(45) Date of Patent: Sep. 1, 2026

(54) VEHICLE FRONT STRUCTURE

(71) Applicant: SUBARU CORPORATION, Tokyo (JP)

(72) Inventor: Akihiro Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 170 days.

(21) Appl. No.: 18/930,051

(22) Filed: Oct. 29, 2024

(65) Prior Publication Data

US 2025/0153677 A1 May 15, 2025

(30) Foreign Application Priority Data

Nov. 9, 2023 (JP) ................................ 2023-191413

(51) Int. Cl.

*B60R 21/34* (2011.01)
*B60R 5/02* (2006.01)
*B62D 25/08* (2006.01)
*B62D 25/12* (2006.01)

(52) U.S. Cl.

CPC ................ *B60R 21/34* (2013.01); *B60R 5/02* (2013.01); *B62D 25/081* (2013.01); *B62D 25/12* (2013.01); *B60R 2021/343* (2013.01)

(58) Field of Classification Search

CPC ......... B60R 21/34; B60R 5/02; B62D 25/081; B62D 25/12; B62D 25/087

See application file for complete search history.

(56) References Cited

U.S. PATENT DOCUMENTS

| | | | | |
|---|---|---|---|---|
| 10,160,418 | B2 * | 12/2018 | Onishi | B60R 19/18 |
| 10,800,458 | B2 * | 10/2020 | Makowski | B60J 10/86 |
| 11,524,722 | B2 * | 12/2022 | Yamaoka | B60R 13/013 |
| 2010/0181803 | A1 * | 7/2010 | Uchino | B62D 25/12 296/193.11 |
| 2021/0284242 | A1 | 9/2021 | Yamaoka | |

FOREIGN PATENT DOCUMENTS

| | | | | |
|---|---|---|---|---|
| JP | 2017202770 | A | * | 11/2017 |
| JP | 2019209771 | A | * | 12/2019 |
| JP | 2021-146741 | A | | 9/2021 |

* cited by examiner

*Primary Examiner* — Faye M Fleming

(74) *Attorney, Agent, or Firm* — Smith, Gambrell & Russell, LLP

(57) ABSTRACT

A vehicle front structure includes a hood, a storage part, and a support. The hood covers a vehicle front of a vehicle from above. The storage part is disposed below the hood and has a shape of a recess including a bottom wall, a front wall, and a rear wall. The support supports the bottom wall of the storage part from below. The support extends in a vehicle width direction of the vehicle and supports the storage part on a front side with respect to a front-rear center of the storage part. The storage part is configured to be bent such that a rear side of the bottom wall with respect to the support moves downward near a rear end of the support by an input from the hood upon a collision with a pedestrian.

8 Claims, 4 Drawing Sheets

40
41
32
70
36
31
33
50
35
60
34
30a
20
30
10
UPWARD
FRONT

FRONT
40
30
50
30a
33
70
32
34
35
36
10

UPWARD
FRONT
40
41
20
70
32
36
31
50
60
30a
30
34
10

VEHICLE FRONT STRUCTURE

CROSS-REFERENCE TO RELATED APPLICATIONS

The present application claims priority from Japanese Patent Application No. 2023-191413 filed on Nov. 9, 2023, the entire contents of which are hereby incorporated by reference.

BACKGROUND

The disclosure relates to a vehicle front structure including a storage part that is disposed below a hood and allows luggage to be stored therein.

Some automobile vehicles include a storage part disposed below a hood and allowing luggage to be stored therein (see, for example, Japanese Unexamined Patent Application Publication (JP-A) No. 2021-146741). JP-A No. 2021-146741 discloses a storage part including a case formed in a box shape having an open top face, and a lid coupled to the case so as to be opened and closed. The case is fixed to a vehicle at two spots on side surfaces and two spots on a rear surface, or four spots in total. A rear fixing part is composed of a pair of washers provided on a lower part of a rear wall. The rear fixing part has circular recesses in an inner surface of the rear wall to contain heads of bolts used for fixation to the vehicle.

SUMMARY

An aspect of the disclosure provides a vehicle front structure. The vehicle front structure includes a hood, a storage part, and a support. The hood covers a vehicle front of a vehicle from above. The storage part is disposed below the hood and has a shape of a recess including a bottom wall, a front wall, and a rear wall. The support supports the bottom wall of the storage part from below. The support extends in a vehicle width direction of the vehicle and supports the storage part on a front side with respect to a front-rear center of the storage part. The storage part is configured to be bent such that a rear side of the bottom wall with respect to the support moves downward near a rear end of the support by an input from the hood upon a collision with a pedestrian.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When an automobile vehicle collides with a pedestrian, the collision of the pedestrian with a hood causes an obliquely downward and rearward force to be exerted from the hood to the storage part. In such a case, the vehicle front structure disclosed in JP-A No. 2021-146741 involves a possibility that a pedestrian injury value increases because firm fixation of the case to the vehicle at the lower part of the rear wall disallows downward or rearward movement of the storage part upon the collision.

It is desirable to provide a vehicle front structure capable of reducing a pedestrian injury value upon a collision with a pedestrian.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
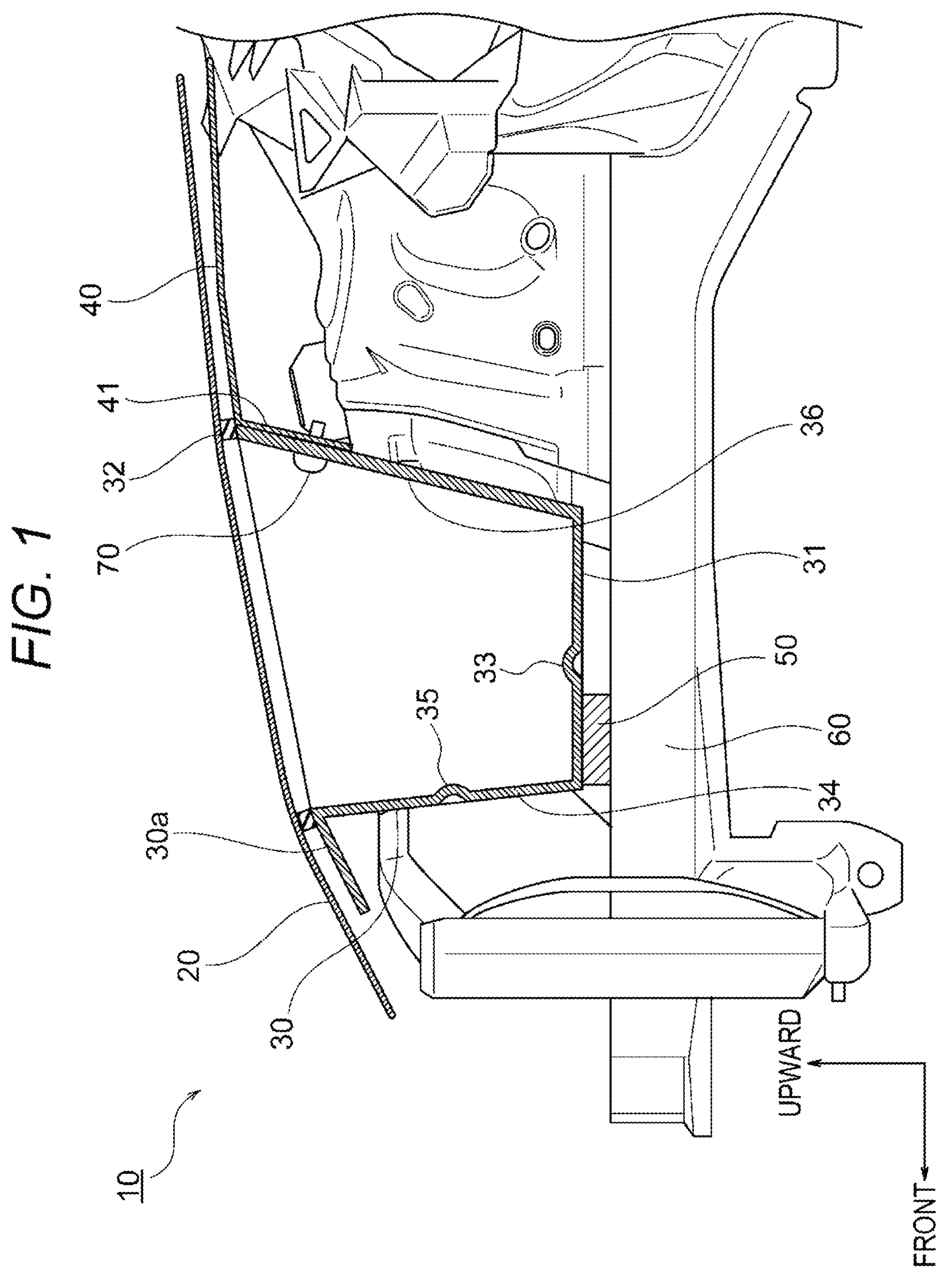
FIG. 1 is a schematic side view of a vehicle front structure, illustrating an embodiment of the disclosure.
Figure 2:
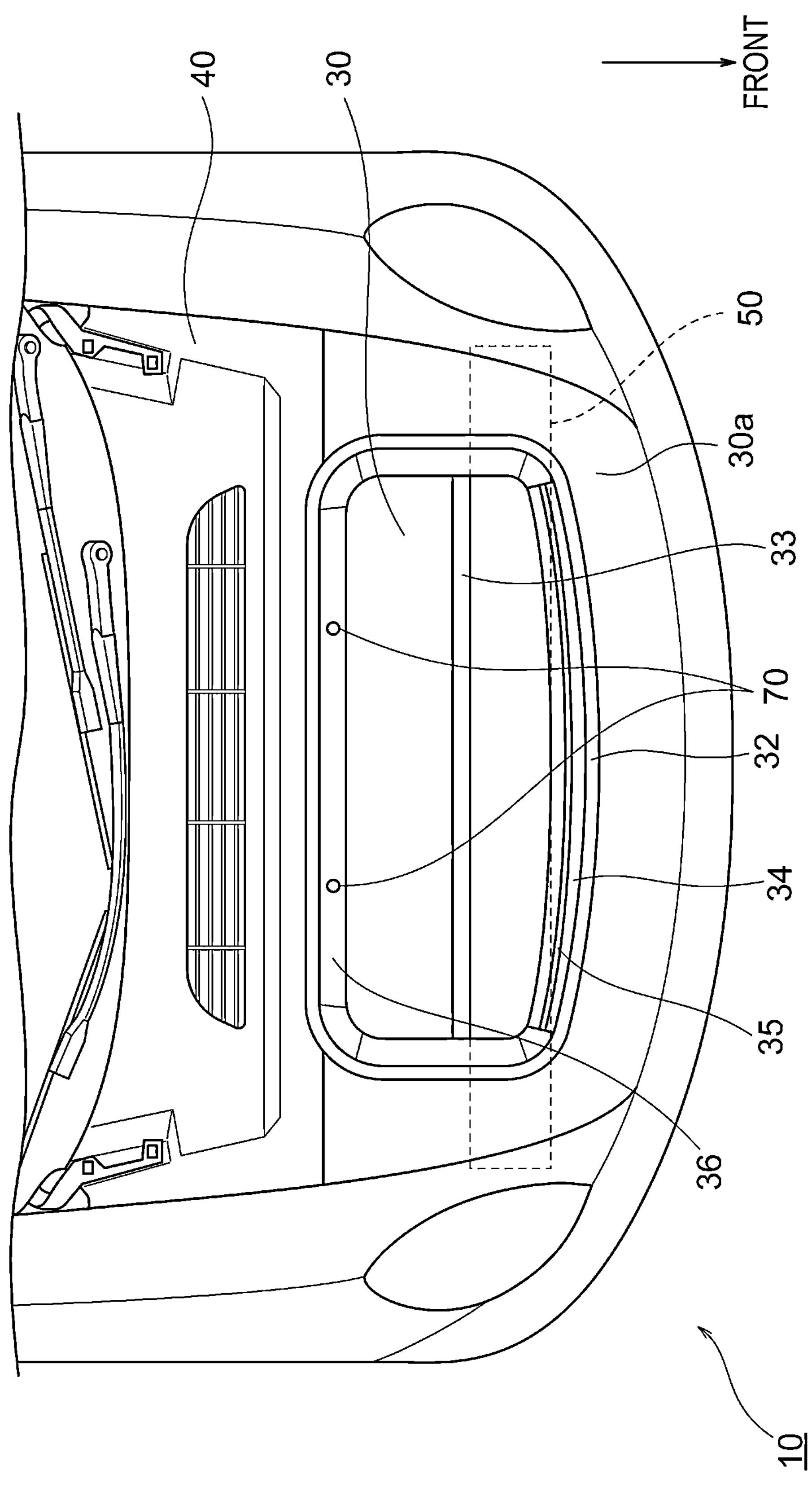
FIG. 2 is a plan view of the vehicle front structure from which a hood is removed.
Figure 3:
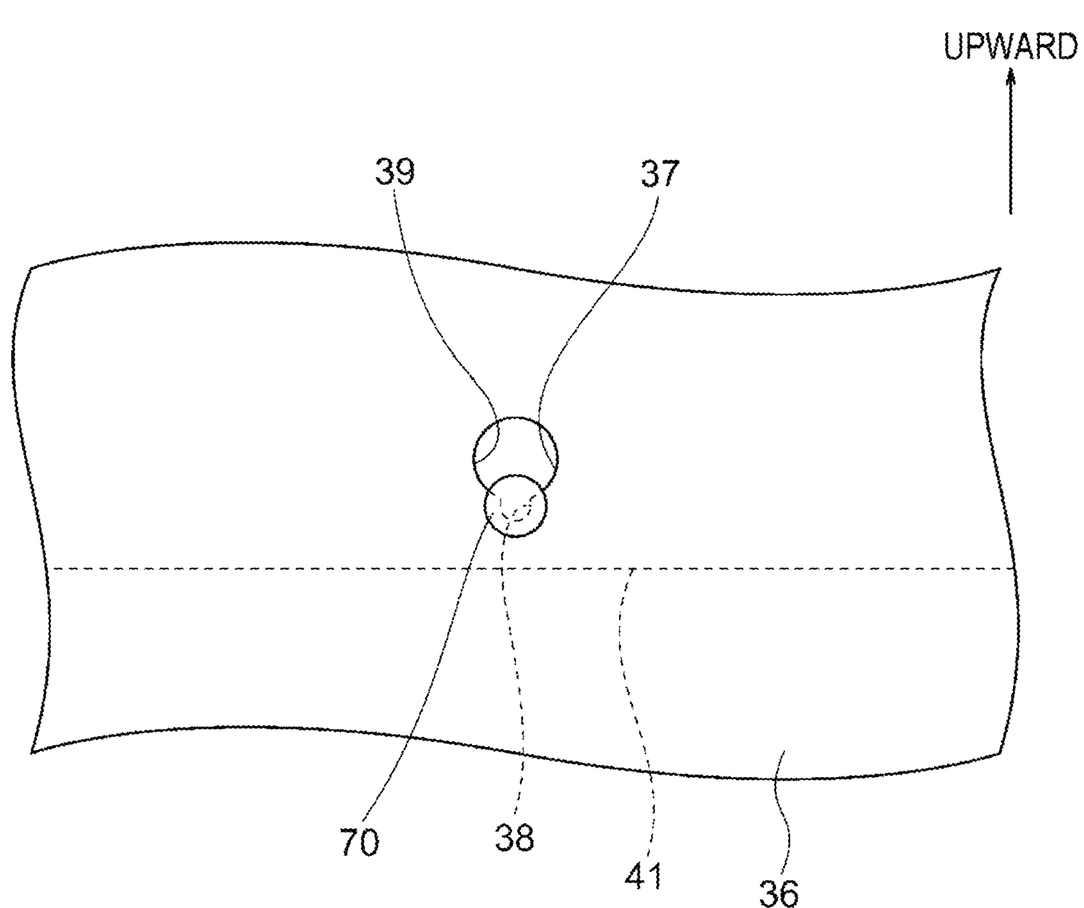
FIG. 3 is a partial front view of a rear wall of a storage part.
Figure 4:
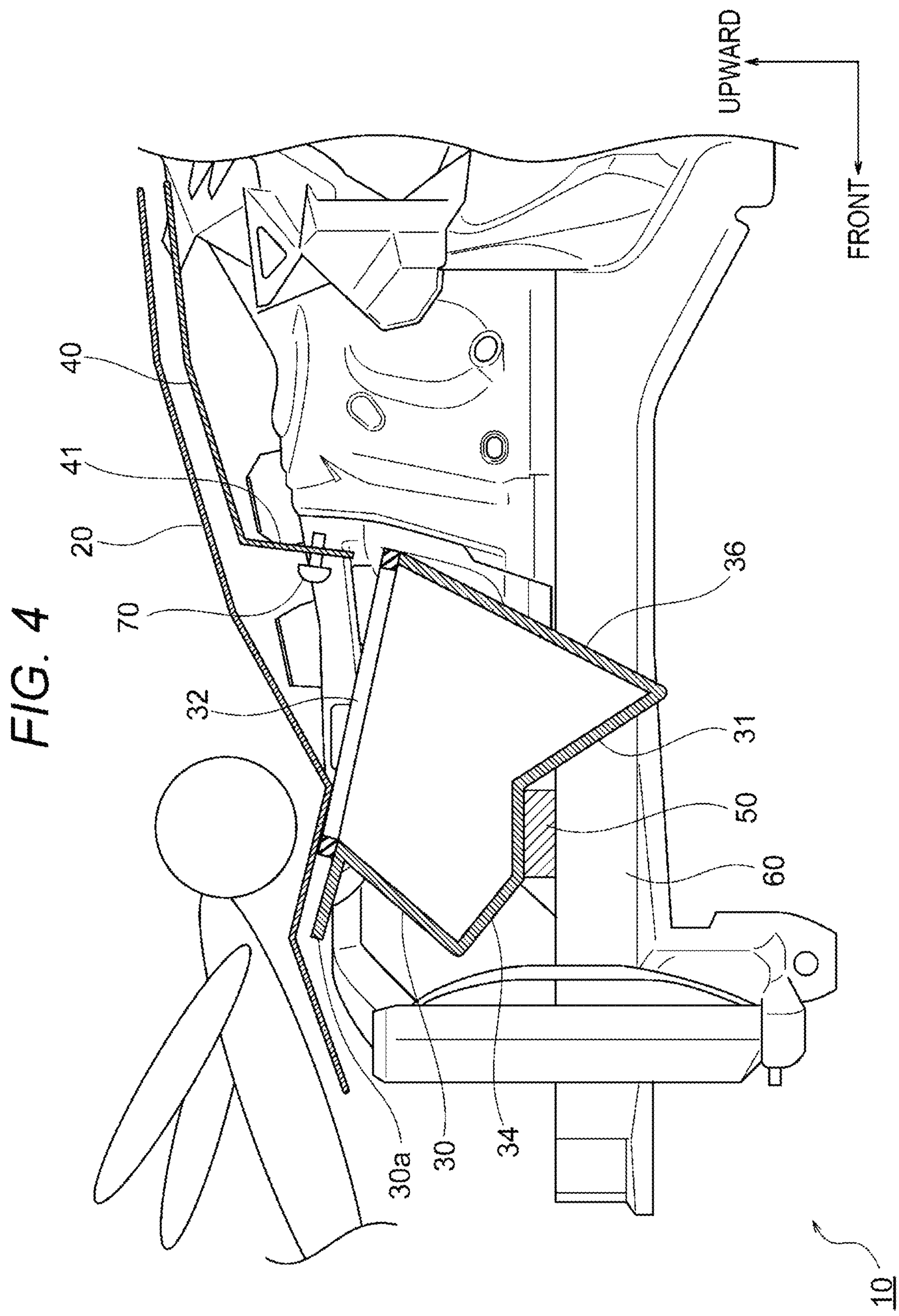
FIG. 4 is a schematic side view of the vehicle front structure, illustrating movement of the storage part upon a collision with a pedestrian.

FIGS. 1 to 4 illustrate the embodiment of the disclosure. FIG. 1 is a schematic side view of a vehicle front structure. FIG. 2 is a plan view of the vehicle front structure from which a hood is removed. FIG. 3 is a partial front view of a rear wall of a storage part. FIG. 4 is a schematic side view of the vehicle front structure, illustrating movement of the storage part upon a collision with a pedestrian.

As illustrated in FIG. 1, an automobile vehicle 10 includes the hood 20 covering a vehicle front from above, and a storage part 30 disposed below the hood 20 and in a shape of a recess having a top opening. Note that FIG. 1 is for illustration purpose, and the illustrations of components and the like unnecessary for the description of the present embodiment are omitted as appropriate. The hood 20 may be made of any material and, for example, may be made of a metal material such as steel or aluminum. The storage part 30 may be made of any material and, for example, may be made of a resin material such as polypropylene or acrylonitrile butadiene styrene. A front side of the hood 20 is movable up and down. Moving the hood 20 upward allows access to the storage part 30. Additionally, the automobile vehicle 10 includes a cowl 40 disposed behind the storage part 30 below the hood 20 and covering a space below the hood 20 from above. The cowl 40 may be made of any material and may be made of a resin material such as polypropylene or acrylonitrile butadiene styrene. The automobile vehicle 10 according to the present embodiment is an electric vehicle, and includes, as a power source, a motor (not illustrated) below the cowl 40.

As illustrated in FIG. 1, the automobile vehicle 10 includes a support 50 that supports a bottom wall 31 of the storage part 30 from below. The support 50 extends in a vehicle width direction and supports the storage part 30 on the front side with respect to a front-rear center of the storage part 30. The support 50 may be made of any material and, for example, may be made of a metal material such as steel or aluminum. In the present embodiment, the support 50 has a widthwise dimension (front-rear direction dimension) smaller than a front-rear direction dimension of the storage part 30. The support 50 has a front end aligned with a front end of the storage part 30. The support 50 has a rear end in a position closer to the front side than the front-rear center of the storage part 30. Additionally, the automobile vehicle 10 includes left and right side frames 60 extending in a front-rear direction. The support 50 is coupled to each of the side frames 60. Each side frame 60 may be made of any material and, for example, may be made of a metal material such as steel or aluminum.

As illustrated in FIG. 1, the storage part 30 includes, at its upper end, a mall 32 as a sealing material. In the present embodiment, as illustrated in FIG. 2, the mall 32 has a ring shape along an opening shape of the storage part 30. The mall 32 is, for example, made of an elastic material such as rubber, and is in contact with a lower surface of the hood 20 with the front side of the hood 20 being lowered. In the present embodiment, as illustrated in FIG. 2, the storage part 30 includes a flange 30*a* that extends horizontally outward from an opening and covers the lower space.

Additionally, the storage part 30 has a bottom bending starting point formed on the bottom wall 31 and serving as a starting point of bending of the bottom wall 31 upon a collision with a pedestrian. In the present embodiment, the bottom bending starting point is a first bead 33 formed on the bottom wall 31 so as to extend in the vehicle width direction. The first bead 33 is formed to protrude upward and is disposed near the rear end of the support 50. In the present embodiment, the first bead 33 has a front end disposed so as to overlap the rear end of the support 50 in plan view.

Additionally, the storage part 30 has a front bending starting point formed on a front wall 34 and serving as a starting point of bending of the front wall 34 upon a collision with a pedestrian. In the present embodiment, the front bending starting point is a second bead 35 formed on the front wall 34 so as to extend in the vehicle width direction. The second bead 35 is formed to protrude rearward and is formed in an up-down center of the front wall 34.

As illustrated in FIG. 1, the cowl 40 includes a front wall 41 disposed along a rear wall 36 of the storage part 30. The rear wall 36 of the storage part 30 is attached to the front wall 41 of the cowl 40 such that restraint of the storage part 30 with respect to the cowl 40 is released by an input from the hood 20 upon a collision with a pedestrian. In the present embodiment, as illustrated in FIG. 1, the rear wall 36 of the storage part 30 is attached to the front wall 41 of the cowl 40 by using a clip 70. As illustrated in FIG. 3, the clip 70 is placed through an insertion hole 37 formed in the rear wall 36 of the storage part 30 and an insertion hole (not illustrated) formed in the front wall 41 of the cowl 40. The insertion hole of the cowl 40 is circular and has a diameter corresponding to a size of a shaft of the clip 70. On the other hand, the insertion hole 37 of the storage part 30 has a general diameter part 38 and an enlarged diameter part 39 and shaped such that an upper side part of the general diameter part 38 partially overlaps a lower side part of the enlarged diameter part 39. The general diameter part 38 has a diameter corresponding to the size of the shaft of the clip 70. The enlarged diameter part 39 has a diameter larger than that of the general diameter part 38. The general diameter part 38 is used in attaching the storage part 30 to the cowl 40. The shaft of the clip 70 moves to the enlarged diameter part 39 by the input from the hood 20 upon a collision with a pedestrian, and thus, the restraint of the storage part 30 with respect to the cowl 40 is released.

In the front structure of the automobile vehicle 10 configured as described above, the mall 32 is in contact with the hood 20 with the front side of the hood 20 being lowered and the storage part 30 being closed. This enables the storage part 30 to be sealed for preventing entry of rainwater, dust, and the like into the storage part 30. Making the mall 32 in contact with the hood 20 in this manner can secure a large capacity of the storage part 30 as compared with the storage part including, at its upper part, a lid for closing an opening.

When placing luggage or any other objects in the storage part 30, a user moves the front side of the hood 20 upward and moves luggage or any other objects from the front of the vehicle into the storage part 30. The storage part 30 is accessed by the user from the front of the vehicle, and thus, luggage or any other objects are often placed in a position closer to the front side in the storage part 30. For example, this tendency is remarkable for the storage of a relatively heavy object. In the present embodiment, the support 50 supports the storage part 30 on the front side with respect to the front-rear center of the storage part 30, and thus, can efficiently support the storage part 30 in which luggage or any other objects are stored in the position closer to the front side.

In the front structure of the automobile vehicle 10, upon a collision with a pedestrian, as illustrated in FIG. 4, the collision of the pedestrian with the hood 20 causes an obliquely downward and rearward force to be exerted from the hood 20 to the storage part 30. At this time, the bottom wall 31 of the storage part 30 is prevented from moving obliquely downward and rearward in a region supported by the support 50 but is not prevented from moving obliquely downward and rearward in a region not supported by the support 50. As a result, the storage part 30 is bent such that the rear side of the bottom wall 31 with respect to the support 50 moves downward near the rear end of the support 50. In the present embodiment, since the first bead 33 serving as the starting point of bending is formed on the bottom wall 31, the bottom wall 31 can be reliably bent at an intended position. This can secure a collision stroke as the automobile vehicle 10 upon a collision with a pedestrian, irrespective of the presence or absence of luggage or any other objects in the storage part 30, and can reduce the pedestrian injury value. For example, when a relatively hard object is stored in the storage part 30, even if the head of the pedestrian collides with the hood 20 near the storage part 30, the pedestrian injury value can be reduced. For example, in the case of the structure in which the mall 32 of the storage part 30 is in contact with the hood 20 as in the present embodiment, although the pedestrian injury value is likely to increase, the capacity of the storage part 30 can be secured and the pedestrian injury value can be reduced by allowing the bottom wall 31 to bend such that the rear side of the bottom wall 31 with respect to the support 50 moves downward upon a collision.

As illustrated in FIG. 4, the storage part 30 is bent such that the upper side of the front wall 34 moves obliquely rearward and downward upon a collision with a pedestrian. In the present embodiment, since the second bead 35 serving as the starting point of bending is formed on the front wall 34 of the storage part 30, the front wall 34 can be reliably bent at an intended position, and a deformation mode of the front wall 34 of the storage part 30 upon a collision with a pedestrian can be accurately controlled.

The rear wall 36 of the storage part 30 is attached to the front wall 41 of the cowl 40 such that the restraint of the storage part 30 with respect to the cowl 40 is released by the input from the hood 20 upon a collision with a pedestrian. Consequently, as illustrated in FIG. 4, the movement of the rear wall 36 of the storage part 30 is not hindered by the front wall 41 of the cowl 40 upon a collision with a pedestrian, and thus, the deformation mode of the storage part 30 can be accurately controlled.

In the embodiment described above, the mall 32 of the storage part 30 is in contact with the hood 20. However, the storage part 30 may include, at its upper part, a lid for closing an opening. That is, the shape, structure, and other characteristics of the storage part can be appropriately changed as long as the storage part has a structure in which the storage part is allowed to bent such that the rear side of the bottom wall with respect to the support moves downward near the rear end of the support by the input from the hood upon a collision with a pedestrian.

In the embodiment described above, the rear wall 36 of the storage part 30 is attached to the front wall 41 of the cowl 40 by using the clip 70. However, the rear wall 36 of the storage part 30 may be attached to the front wall 41 of the cowl 40 by using another component or another mechanism. In some embodiments, also in this case, the restraint of the storage part with respect to the cowl is intended to be released by the input from the hood upon a collision with a pedestrian. For example, one of the storage part 30 and the cowl 40 may include a claw and the other may include a hole allowing the claw to be fitted therein. The claw may be configured to be broken by the input upon a collision. Note that, for example, in a case where a sufficient measure for reducing a pedestrian injury value has already been made with the aid of the deformation of the bottom wall of the storage part upon a collision, the mechanism for releasing the restraint of the storage part with respect to the cowl can be omitted.

In the embodiment described above, the second bead 35 extending in the vehicle width direction is formed on the front wall 34 as the front bending starting point. However, for example, the plate thickness or the material of the front wall 34 may be changed, and this change point may be used as the front bending starting point. Additionally, for example, forming a rib or the like on at least one of the upper side and the lower side of the front wall 34 may provide a change in rigidity, and this change point may be used as the front bending starting point. Furthermore, the up-down position of the front bending starting point can be appropriately changed in accordance with an intended deformation mode. Note that, for example, in the case where the sufficient measure for reducing the pedestrian injury value has already been made with the aid of the deformation of the bottom wall of the storage part upon a collision, the front bending starting point can be omitted.

In the embodiment described above, the first bead 33 extending in the vehicle width direction is formed on the bottom wall 31 as the bottom bending starting point. However, for example, the plate thickness or the material of the bottom wall 31 may be changed, and this change point may be used as the bottom bending starting point. Additionally, for example, forming a rib or the like on at least one of the front side and the rear side of the bottom wall 31 may provide a change in rigidity, and this change point may be used as the bottom bending starting point. Furthermore, the front-rear position of the bottom bending starting point can be appropriately changed in accordance with an intended deformation mode. The bottom bending starting point can be omitted as long as, even with the support 50 alone, the bottom wall 31 of the storage part 30 is allowed to bend at an intended position upon a collision of a pedestrian.

In the embodiment described above, the front end of the support 50 is aligned with the front end of the storage part 30. However, the front-rear position of the support 50 can be appropriately changed as long as the support 50 supports the storage part 30 on the front side with respect to the front-rear center of the storage part 30.

Although the embodiment of the disclosure has been described above, the embodiment described above is not intended to limit the disclosure recited in claims. Note that not all of combinations of features described in the embodiment are necessarily indispensable for the solutions described in the SUMMARY of the disclosure.

According to the vehicle front structure of the disclosure, a pedestrian injury value can be reduced upon a collision with a pedestrian.

The invention claimed is:

1. A vehicle front structure comprising:

a hood covering a vehicle front of a vehicle from above;

a storage part disposed below the hood, the storage part having a shape of a recess comprising a bottom wall, a front wall, and a rear wall; and a support supporting the bottom wall of the storage part from below, wherein the support extends in a vehicle width direction of the vehicle and supports the storage part on a front side with respect to a front-rear center of the storage part, and the storage part is configured to bend such that a rear side of the bottom wall with respect to the support moves downward near a rear end of the support by an input from the hood upon a collision with a pedestrian.

2. The vehicle front structure according to claim 1, wherein the storage part has a bottom bending starting point disposed on the bottom wall and serving as a starting point of bending of the bottom wall upon the collision with the pedestrian.

3. The vehicle front structure according to claim 2, wherein the storage part has a front bending starting point disposed on the front wall and serving as a starting point of bending of the front wall upon the collision with the pedestrian.

4. The vehicle front structure according to claim 3, further comprising a cowl disposed behind the storage part below the hood and covering a space below the hood from above, wherein the cowl comprises a front wall disposed along the rear wall of the storage part, and the rear wall of the storage part is attached to the front wall of the cowl such that restraint of the storage part with respect to the cowl is released by the input from the hood upon the collision with the pedestrian.

5. The vehicle front structure according to claim 1, wherein the storage part has a top opening and comprises a sealing material provided in the top opening and in contact with the hood with the hood being lowered.

6. The vehicle front structure according to claim 2, wherein the storage part has a top opening and comprises a sealing material provided in the top opening and in contact with the hood with the hood being lowered.

7. The vehicle front structure according to claim 3, wherein the storage part has a top opening and comprises a sealing material provided in the top opening and in contact with the hood with the hood being lowered.

8. The vehicle front structure according to claim 4, wherein the storage part has a top opening and comprises a sealing material provided in the top opening and in contact with the hood with the hood being lowered.

* * * * *